United States Patent
Masili et al.

(10) Patent No.: US 11,050,841 B2
(45) Date of Patent: Jun. 29, 2021

(54) USER PROFILE SHARING

(71) Applicant: Microsoft Technology Licensing, LLC, Redmond, WA (US)

(72) Inventors: Gabriele Masili, Mercer Island, WA (US); Charlene Marie Douglass, Friday Harbor, WA (US); Renee Thompson Hunter, Bowie, MD (US); Jeremy Eugene Kelly, North Bend, WA (US); Raymond Robert Ringhiser, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/544,684

(22) Filed: Aug. 19, 2019

(65) Prior Publication Data
US 2021/0058483 A1    Feb. 25, 2021

(51) Int. Cl.
*H04L 29/08* (2006.01)
*H04L 12/24* (2006.01)

(52) U.S. Cl.
CPC ........ *H04L 67/306* (2013.01); *H04L 41/0816* (2013.01); *H04L 41/22* (2013.01); *H04L 67/26* (2013.01); *H04L 67/12* (2013.01); *H04L 67/20* (2013.01)

(58) Field of Classification Search
CPC ....... H04L 67/306; H04L 67/26; H04L 67/20; H04L 67/12; H04L 41/0816; H04L 41/22
See application file for complete search history.

(56) References Cited

U.S. PATENT DOCUMENTS

| | | |
|---|---|---|
| 6,519,581 B1 | 2/2003 | Hofmann et al. |
| 8,676,968 B2 | 3/2014 | Cowham et al. |
| 9,621,728 B2 | 4/2017 | Mccormack et al. |
| 9,965,443 B2 | 5/2018 | Eggink et al. |
| 9,997,158 B2 | 6/2018 | Chen et al. |
| 10,171,662 B1 | 1/2019 | Zhou et al. |
| 10,187,337 B2 | 1/2019 | Smullen et al. |

(Continued)

FOREIGN PATENT DOCUMENTS

| | | | |
|---|---|---|---|
| EP | 3453160 A1 | 3/2019 | |
| KR | 2009-L57254 | * 6/2009 | ............. H04W 8/24 |
| KR | 20140115033 A | 9/2014 | |

OTHER PUBLICATIONS

"Hardware and BIOS Information", Retrieved from: https://www.nexthink.com/library/hardware-and-bios-information/, Retrieved Date: Jun. 17, 2019, 02 Pages.

(Continued)

*Primary Examiner* — Michael C Lai

(74) *Attorney, Agent, or Firm* — International IP Law Group, PLLC

(57) ABSTRACT

A method that enables sharing a technology profile is described herein. The method includes determining at least one technology ecosystem of a first user. The method also includes generating a technology profile for the first user from the technology ecosystem, wherein the technology profile comprises components from the technology ecosystem associated with the first user. Finally, the method includes selectively sharing a shared technology profile with a second user, wherein the shared technology profile is determined by the first user and is derived from the technology profile.

15 Claims, 11 Drawing Sheets

(56) References Cited

U.S. PATENT DOCUMENTS

| | | | |
|---|---|---|---|
| 10,694,038 | B2 | 6/2020 | Abraham et al. |
| 2002/0087625 | A1* | 7/2002 | Toll ...................... H04L 69/329 709/203 |
| 2004/0133809 | A1 | 7/2004 | Dahl et al. |
| 2006/0120518 | A1 | 6/2006 | Baudino et al. |
| 2008/0051081 | A1* | 2/2008 | Nelson .................... H04L 67/22 455/432.3 |
| 2008/0183852 | A1 | 7/2008 | Pramer et al. |
| 2008/0228503 | A1 | 9/2008 | Buchheit |
| 2009/0245500 | A1 | 10/2009 | Wampler |
| 2010/0144318 | A1* | 6/2010 | Cable .................. H04L 67/1095 455/412.1 |
| 2011/0141919 | A1 | 6/2011 | Singh et al. |
| 2011/0320741 | A1* | 12/2011 | Tian .................... G06F 16/9038 711/147 |
| 2015/0038130 | A1 | 2/2015 | Mao et al. |
| 2015/0103995 | A1 | 4/2015 | McCormack et al. |
| 2015/0207830 | A1 | 7/2015 | Deluca et al. |
| 2015/0278210 | A1* | 10/2015 | Novotny ............ G06Q 30/0251 707/733 |
| 2016/0188902 | A1* | 6/2016 | Jin ........................ H04L 67/306 726/28 |
| 2016/0283995 | A1 | 9/2016 | Matula et al. |
| 2017/0148073 | A1 | 5/2017 | Nomula et al. |
| 2018/0054523 | A1 | 2/2018 | Zhang et al. |
| 2018/0143973 | A1 | 5/2018 | Hambrick et al. |
| 2018/0239837 | A1 | 8/2018 | Wang |
| 2018/0285413 | A1 | 10/2018 | Vora et al. |
| 2018/0376002 | A1 | 12/2018 | Abraham |
| 2021/0058844 | A1 | 2/2021 | Ringhiser et al. |

OTHER PUBLICATIONS

"How to generate a Microsoft System Information report (MSINFO32)", Retrieved from: https://nvidia.custhelp.com/app/answers/detail/a_id/2507/~/how-to-generate-a-microsoft-system-information-report-%28msinfo32%29, May 2, 2019, 02 Pages.

"Application as filed in Indian Patent Application No. 1405/CHE/2009", Filed Date: Jun. 15, 2009, 27 Pages.

"Non Provisional Application Filed in U.S. Appl. No. 16/263,993", filed Jan. 31, 2019, 30 Pages.

Plett, et al., "Systeminfo", Retrieved from: https://docs.microsoft.com/en-us/windows-server/administration/windows-commands/systeminfo, Oct. 16, 2017, 02 Pages.

"International Search Report and Written Opinion Issued in PCT Application No. PCT/US20/037689", dated Aug. 19, 2020, 12 Pages.

"Human handover", Retrieved from: https://wotnot.io/human-handover/, Retrieved Date: Jun. 26, 2019, 03 Pages.

"Kore.ai Bots Platform Architecture", Retrieved from: https://cdn2.hubspot.net/hubfs/3458671/Content%20Assets%20(WP,%20Briefs,%20Guides,%20eBooks,%20etc)/Guides/GUIDE-Kore-ai-Bots-Platform-Architecture.pdf, Retrieved Date: Jun. 3, 2019, 42 Pages.

"Managing the Chatbot Human Handoff: Tips for Success", Retrieved from: https://www.hubtype.com/blog/managing-chatbot-human-handoff/, Nov. 15, 2018, 06 Pages.

Iqbal, et al.,"Transition conversations from bot to human", Retrieved from: https://docs.microsoft.com/en-us/azure/bot-service/bot-service-design-pattern-handoff-human?view=azure-bot-service-4.0, May 2, 2019, 04 Pages.

Bhartiya, Neeharika, "How to Nail the Bot to Human Handoff", Retrieved from: https://blog.sendsonar.com/2016/12/19/how-to-nail-the-bot-to-human-handoff/, Dec. 19, 2016, 08 Pages.

Biswas, Satadeep, "Chatbot Human Handoff: Seamless human takeover in a hybrid solution", Retrieved from: https://www.kommunicate.io/blog/chatbot-human-handoff/, Feb. 11, 2019, 17 Pages.

Chug, Poonam, "Human Hand-Off in Service Desk Bots", Retrieved from: https://botcore.ai/blog/human-hand-off-service-desk-bots/, Feb. 28, 2018, 14 Pages.

"International Search Report and Written Opinion Issued in PCT Application No. PCT/US2020/037107", dated Sep. 22, 2020, 12 Pages.

"Chatbots 101 Your Go-To Guide for Understanding AI-Powered Chatbots", Retrieved From: https://kore.ai/wp-content/uploads/bots-101-ebook-general.pdf, Jul. 13, 2017, 47 Pages.

"Non Final Office Action Issued in U.S. Appl. No. 16/544,677", dated Nov. 10, 2020, 18 Pages.

* cited by examiner

800

USER PROFILE SHARING

BACKGROUND

Generally, a technology ecosystem is a collection of components that operate according to a common computing platform. The technology ecosystem enables interactions between people, hardware, software, and services. A computing platform, such as an operating system, can manage hardware and software, and also provide services within the ecosystem. The operating system may also prescribe the particular hardware, software, and services that are compatible with the operating system. This management provides a predictable interface for people interacting with hardware, software, and services of a technology ecosystem.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method is described. The method includes determining at least one technology ecosystem of a first user. The method also includes generating a technology profile for the first user from the technology ecosystem, wherein the technology profile comprises components from the technology ecosystem associated with the first user. Finally, the method includes selectively sharing a shared technology profile with a second user, wherein the shared technology profile is determined by the first user and is derived from the technology profile.

In another embodiment described herein, a system is described. The system comprises a fundamental component and a profile manager. The fundamental component is used to establish a technology ecosystem, wherein a technology profile for a first user of the technology ecosystem comprises components from the technology ecosystem associated with the first user. The profile manager is configured to generate the technology profile for the first user. The profile manager is also configured to selectively share a shared technology profile with a second user, wherein the shared technology profile is determined from the first user and is derived from the technology profile.

Another embodiment described herein includes a computer-readable storage medium. The computer-readable storage medium bears computer executable instructions which, when executed on a computing system comprising at least a processor, carry out a method for user profile sharing. The method includes generating a technology profile for the first user from a technology ecosystem, wherein the technology profile comprises components from the technology ecosystem associated with the first user. The method also includes selectively sharing a shared technology profile with a second user in response to an indication from the first user. The shared technology profile is determined by the first user and is derived from the technology profile. An update of the shared technology profile is shared with the second user in response to an update of the technology profile as shared by the first user.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
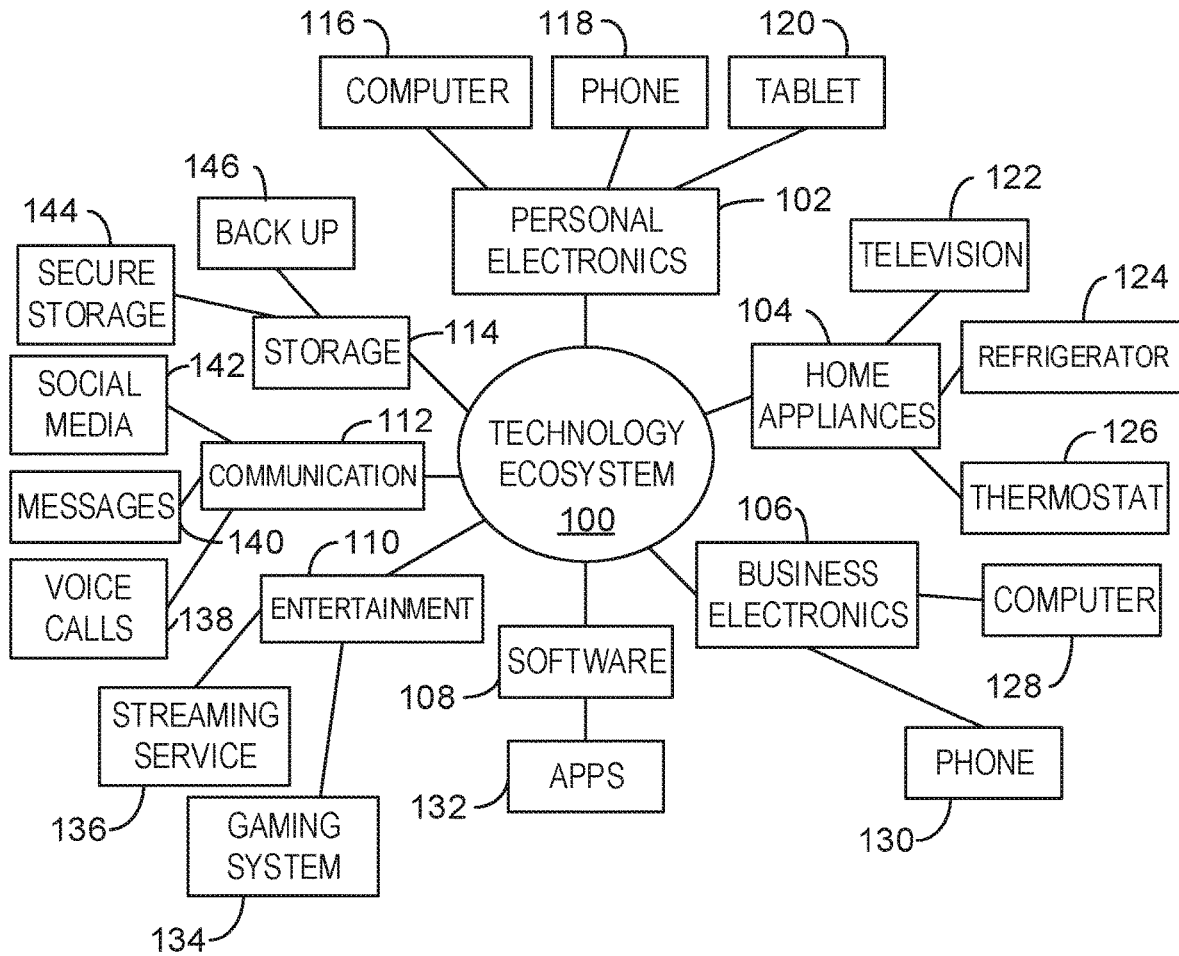
FIG. 1 is an example of a technology ecosystem.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Users can access any number of devices that deliver some identified functionality. As used herein, a functionality of a device or component may refer to a purpose of the device or component. A device or component may have multiple functions within an ecosystem. For example, a printer's primary function may be printing. However, the printer may also function as a scanner, copy machine, a fax machine, or any combination thereof. Any number of devices may be components of a technology ecosystem. A technology ecosystem may be identified by fundamental components, where the functionality of the fundamental components provide support for services of other components of the technology ecosystem. For example, a computing platform may be considered a fundamental component of a technology ecosystem. As used herein, computing platform may refer to the hardware or software executing on the hardware that provides services, interfaces, or a framework for other components of a technology ecosystem. For example, an operating system may be a fundamental component of a technology ecosystem. In some cases, the operating system enables other components of the technology ecosystem to communicate in an established manner. Additionally, a particular set of hardware, such as processors, interconnects, and data storage, may be considered a fundamental component of a technology ecosystem. The hardware, as a fundamental component of the technology ecosystem, can dictate the other hardware, software, and services supported by the technology ecosystem.

Thus, a technology ecosystem includes one or more fundamental components that provide support for other components within the ecosystem. In some cases, the other components of the technology ecosystem may expand the functionality and capabilities of the fundamental components in the same technology ecosystem. In this manner, a technology ecosystem may vary to satisfy the changing needs of a user. A user can acquire various components within a technology ecosystem according to the needs or desires of the user. In embodiments, the particular components of a technology ecosystem acquired by a user may be referred to as a technology (tech) profile.

A technology profile is a dynamic set of components from one or more technology ecosystems. Typically, components within a technology ecosystem seamlessly communicate and interact with other components of the same technology ecosystem. By selecting components from a same technology ecosystem, a user can easily build a technology profile where each component is compatible with other components and can operate as intended. However, changing support and lifecycles may prevent components of a same technology ecosystem from operating according to their full functionalities. A user's technology profile may also include components from a plurality of technology ecosystems. In some cases, components from different technology ecosystems may not function as intended across technology ecosystems.

The present techniques enable sharing of a technology profile. In embodiments, a user can selectively share their technology profile with other users or organizations. In embodiments, a user can selectively share their technology profile to assist individuals when acquiring devices for the sharer to ensure compatibility. Similarly, a user can selectively share their technology profile with a manufacturer or developer to allow a notification or recommendation of compatible upgrades or new products and services. The technology profile as described herein may include, but is not limited to, machines, peripherals, and other technology ecosystem components. In embodiments, a technology profile may be generated according to various techniques to identify and detect components, as well as to acquire configuration data of each component within a technology ecosystem. The technology profile may be selectively shared according to manual or automatic criteria. In embodiments, the shared technology profile may be automatically updated the profile based an event.

Accordingly, the technology profile according to the present techniques enables an assured compatibility of devices acquired for addition to a particular user's technology ecosystem, where the acquisition is based on information contained within the user's technology profile. Further, sharing the user's technology profile enables a second party to provide devices to the user with an assurance that the devices will operate as expected. In embodiments, a second party may also suggest devices to the user based on a functionality desired by the user and information from the user's technology profile. Sharing a technology profile may also enable the acquisition or suggestion of newer components for addition to the user's technology ecosystem. For example, the newer components may offer similar functionality to a component already existing within the user's technology ecosystem. However, the functionality of the newer component may be more efficient, faster, or otherwise improved when compared to the functionality of the existing component. Sharing the technology profile enables the recipient of a shared technology profile to provide or suggest components to a user that can replace an existing component with a newer component.

Figure 11:
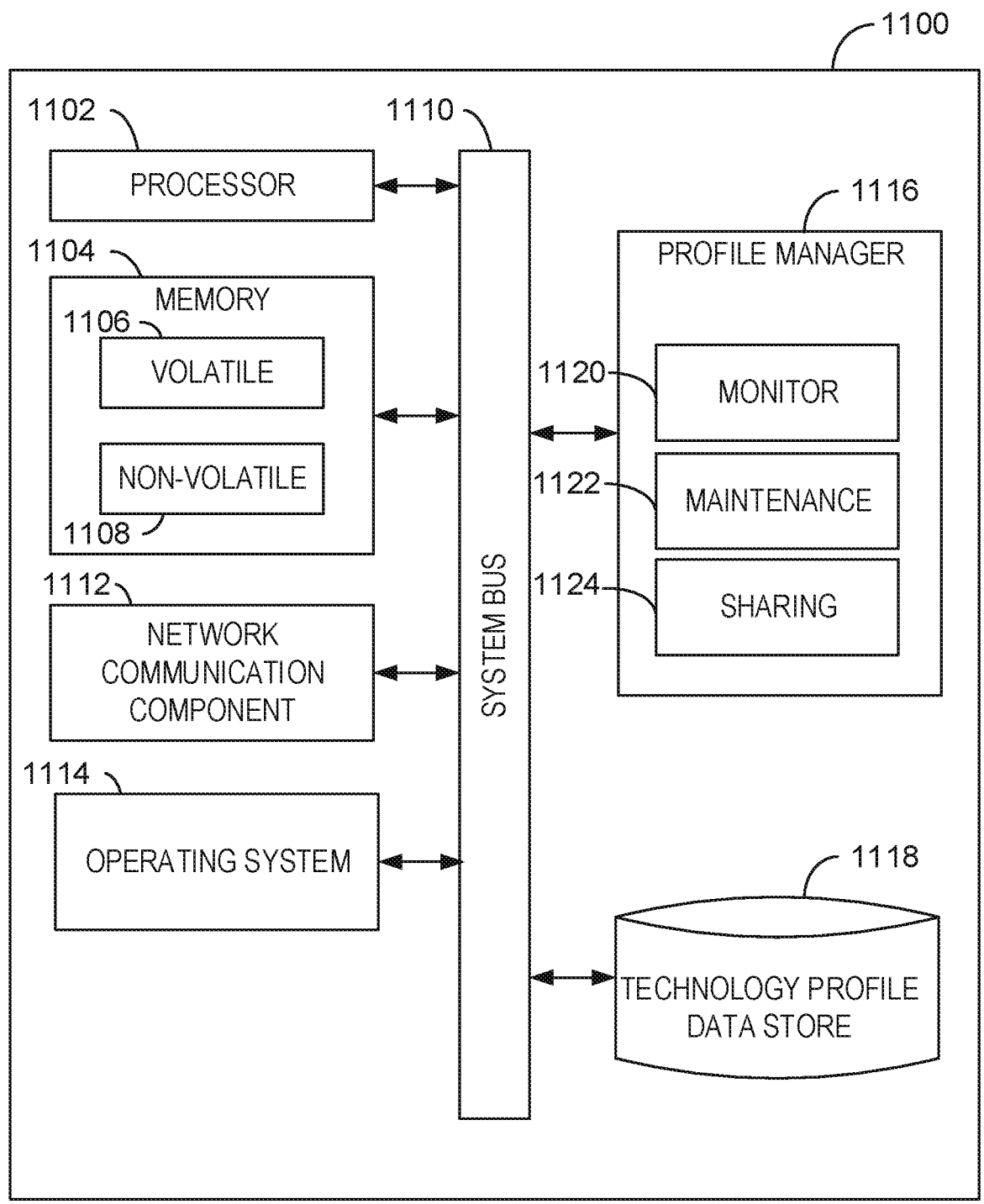
FIG. 11 is a block diagram illustrating an exemplary computing device configured to enable sharing of a technology profile according to aspects of the disclosed subject matter.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 11 discussed below provides details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device.

FIG. 1 is an example of a technology ecosystem 100. A technology ecosystem can vary according to user needs, requirements, and intended use. In some cases, a technology ecosystem can be defined by the person or persons interacting with various hardware, systems, software, and services. In some cases, a user may own or be associated with components from one or more technology ecosystems as defined by a common platform. As illustrated, the technology ecosystem 100 includes hardware, software, systems, and services. While the hardware, software, systems, and services are illustrated as separate components of the ecosystem 100, they may often be integrated components across the technology ecosystem. The technology ecosystem 100 enables the seamless interaction of a plurality of components. In an ecosystem, communication paths are defined that dictate the flow of information, and ultimately the rendering of services within the ecosystem.

As described herein, a user is an operator or owner of components that exist in one or more technology ecosystems. In examples, a component of a technology ecosystem that is operated, owned, or available to the user may be referred to as associated with the user. A user's technology profile may include components that are operated, owned, or associated with the user. Additionally, components may be acquired when they are made available to the user. A user may acquire components for addition to the user's technology ecosystem. A second party may also acquire components for addition to a first party's ecosystem. For example, an information technology (IT) professional of an organization may be tasked with the management and acquisition of components for user who work within the organization and departments within the organization.

Further, the technology ecosystem 100 as illustrated in FIG. 1 is for exemplary purposes and should not be viewed as limiting on the possible components of a technology ecosystem. As is generally understood, a technology ecosystem may include any hardware, software, and services as used by people. In FIG. 1, the technology ecosystem 100 includes hardware such as personal electronics 102, home appliances 104, and business electronics 106. The technology ecosystem further includes software 108. Additionally, the technology ecosystem 100 includes services such as entertainment 110 and communication 112. Finally, the technology ecosystem 100 further includes storage 114. In some cases, storage 114 represents the hardware associated with storing data transmitted and received within the technology ecosystem. In other cases, storage 114 represents a service of storing data transmitted and received within the technology ecosystem.

Generally, interactions and communication flow between the personal electronics 102, home appliances 104, business electronics 106, software 108, entertainment 110, communication 112, and storage 114 is according to a respective platform. As described herein a platform or computing platform may be the hardware, software, or any combination thereof that supports the functionality of the technology ecosystem components. Within the technology ecosystem 100, the interactions between people, hardware, software, and services are enabled by each technology ecosystem components enabling a particular type of interaction from other components. Thus, components of an ecosystem may be referred to as compatible when the component can operate for its intended purpose within the particular technology ecosystem.

The personal electronics 102 includes a computer 116, a phone 118, and a tablet 120. Each of the computer 116, the phone 118, and the tablet 120 may operate according to various operating systems a number of hardware configurations. In some cases, the hardware and software of one personal electronic 102 may not be compatible with the hardware and software of another personal electronic 102.

The technology ecosystem 100 also includes home appliances 104, such as a television 122, a refrigerator 124, and a thermostat 126. Often, home appliances have the ability to communicate and operate with other devices in a technology ecosystem. For example, a thermostat 126 may transmit home temperature data to a personal electronic 102, such as the phone 118. In this example, the thermostat 126 may access software 108 such as an application 132.

Similar to personal electronics 102, the technology ecosystem 100 may also include business electronics 106. As used here in, business electronics refers to electronic devices used for work/employment purposes as opposed to personal devices. Often, business electronics are under control of an organization that employs a user. The technology ecosystem 100 includes entertainment 110, such as a streaming service 136 and a gaming system 134. Communication 112 includes voice call service 138, messaging 140, and social media 142. Finally, storage 114 includes secure storage 144 and backup 146. While a number of hardware, software, and services are illustrated in the example of FIG. 1, the example of FIG. 1 should not be viewed as limiting. In embodiments, a technology ecosystem from the perspective of an individual may include additional or fewer components than those described in FIG. 1.

As illustrated by the technology ecosystem of FIG. 1, each component of the technology ecosystem may provide various functionality within the ecosystem. For example, a user may enjoy the use of a home appliance such as the television 122. Accordingly, as a standalone component, the television 122 may provide value to a user. However, the television may be of even more value to the user if the television can operate in conjunction with a streaming service 136 or a gaming system 134. Thus, prior to acquiring a television 122, a user might find it helpful to know if the streaming service 136 or the gaming system 134 is compatible with the television 122. Generally, the addition of components to a technology ecosystem is often based on a perception or reality of compatibility with existing components of the technology ecosystem. In some cases, the particular ecosystem desired by a user dictates the particular components used by the user within the user's technology ecosystem. Often, a user may not own particular components available in a technology ecosystem.

The present techniques enable sharing of a technology profile. In embodiments, a technology profile is an outline or description of hardware, software, or services associated with one or more people. The technology profile can be abstracted as described below. In embodiments, a technology profile is a subset of components within a technology ecosystem available to a particular user. For example, the technology profile may include, versions of an operating system present on components within the ecosystem, all drivers (such as video, Bluetooth, etc.), sound cards, connected peripherals and their profiles (such as a particular printer with its current software build), and the like.

Figure 2:
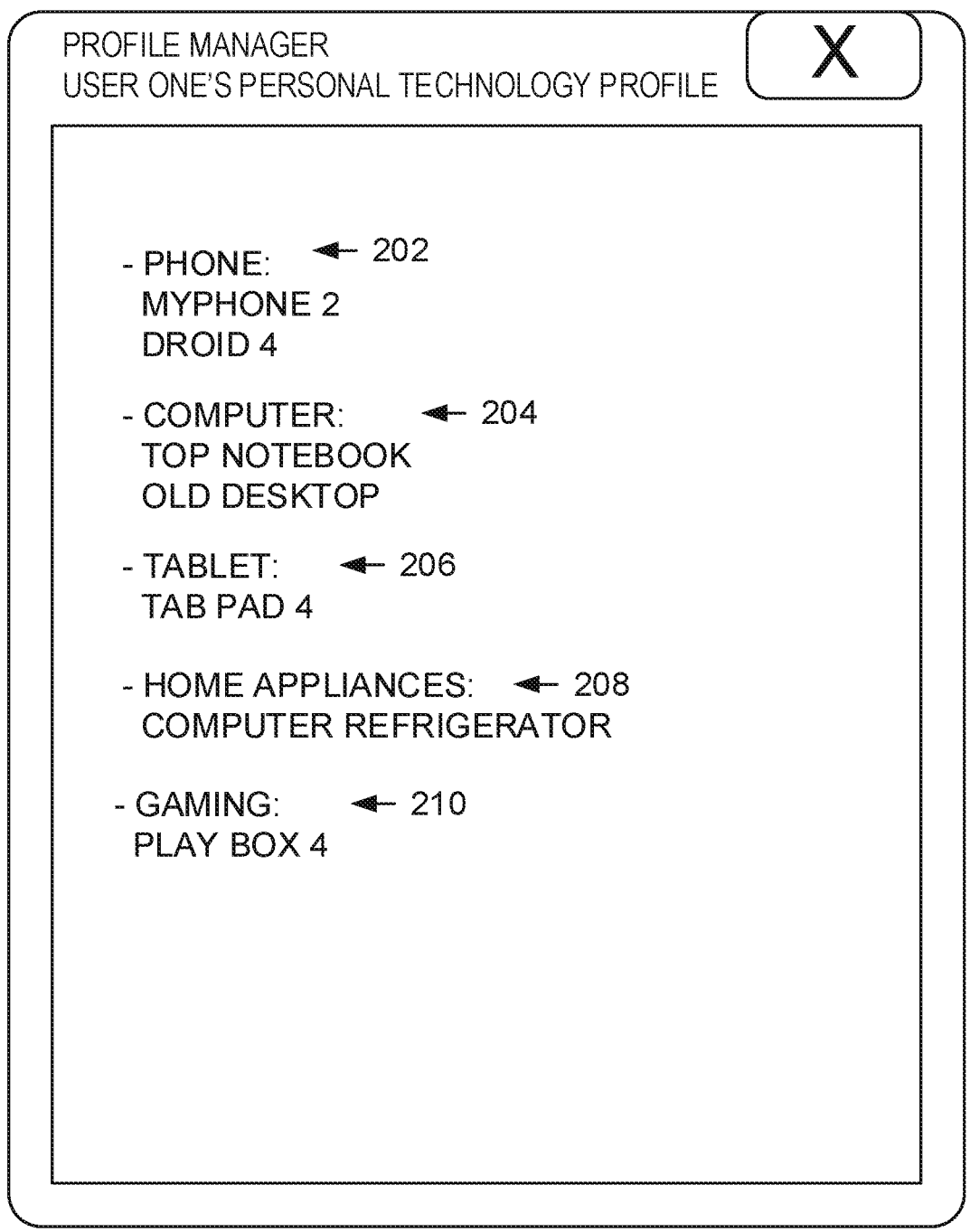
FIG. 2 is an illustration of a technology profile.

FIG. 2 is an illustration of a technology profile 200. The technology profile may be derived from one or more technology ecosystems. The technology profile identifies the particular hardware, software, systems, and services associated with a user. As illustrated in FIG. 2, a technology profile for a "User One" is illustrated. At reference number 202, the phone or phones associated with the User One is listed in the technology profile. In the example of FIG. 2, User One is associated with a MyPhone 2 and a Droid 4. At reference number 204, the computer or computers associated with User One are listed. In the example of FIG. 2, User One is associated with a Top Notebook and an Old Desktop. Further, at reference number 206, the tablet or tablets associated with the User One are listed. In the example of FIG. 2, User One is associated with a Tab Pad 4. At reference number 208, the home appliances associated with the User One are listed. In the example of FIG. 2, User One is associated with a Computer Refrigerator. Finally, at reference number 210, the gaming services or systems associated with User One are listed. In the example of FIG. 2, User One is associated with a Play Box 4.

For ease of description, a limited number of components are illustrated in the technology profile 200. However, any components or devices that enable some functionality within a technology ecosystem may be included in a technology profile. For example, the technology profile may list versions of software and applications (apps) owned by a user. Moreover, the technology profile may include the equipment or hardware associated with devices of the technology profile. For example, with respect to the computer components 204 listed in the technology profile, the technology profile may further list the types of components within the Top Notebook and the Old Desktop. These components may include, but are not limited to, expansion cards, processors, storage devices, heatsinks, fans, displays, and the like. Further, the technology profile may also include components are compatible with one or more technology ecosystems. For example, a robotic vacuum, automobile, fitness equipment, Internet of Things (IoT) based devices, and the like can be listed in a technology profile.

In some cases, a user may be unaware of available products, services, hardware, and software associated with their existing technology profile. Further, a user that owns one or more devices may be unaware of if another device will operate as expected with the existing one or more devices. For example, it would be possible for a new peripheral device, such as a printer, to be incompatible with a user's existing devices. Thus, a user often lacks awareness of what products are compatible with components already owned, operated, or associated with the user. This lack of awareness may be a hinderance in the acquisition of components. For example, if a user already knows that their existing printer operates as expected, the user may be less likely to acquire a new printer if the user is not explicitly informed that the new printer will operate as expected with the user's existing devices. This lack of knowledge may also result in frustration with devices when they do not operate as expected. When components are acquired by a second party for use by a first party, this lack of knowledge may create excess when the second party inadvertently acquires devices already owned, operated, or available to the first party. Further, when components are acquired by a second party for use by a first party, this lack of knowledge may also leave a user with devices that perform duplicate functions. Finally, this lack of knowledge may create unnecessary effort in terms of research to acquire an appropriate device for a desired functionality.

Figure 3:
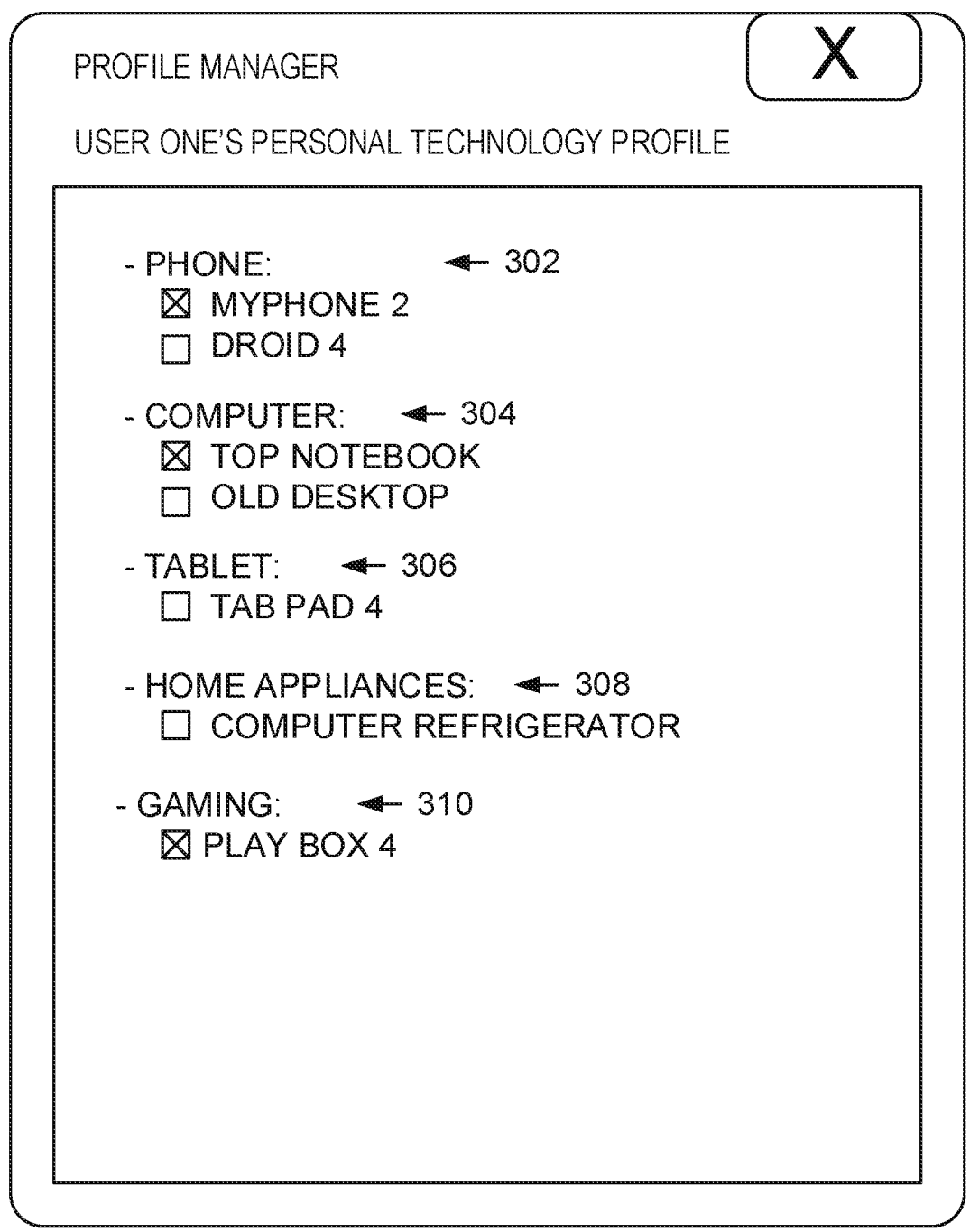
FIG. 3 is an illustration of sharing a technology profile via a profile manager.

FIG. 3 is an illustration of sharing a technology profile via a profile manager 300. Prior to sharing a technology profile, the technology profile is generated. The technology profile may be generated by the profile manager from one or more technology ecosystems. In some cases, the technology profile may be generated by the profile manager by tracking and identifying all devices to access or interface with a given network. For example, games, devices, and other technologies interfacing with a particular platform may be identified as a component of a user's technology profile. Thus, the technology profile can be generated by detecting and identifying all components associated with a user that interact, access, or serve a component of the technology ecosystem.

In embodiments, the profile manager 300 may be an operating system service that displays a list of all available components associated with a user. In embodiments, the profile manager may be populated with components by automatically identifying components coupled with a computing device on which the operating system executes. For example, the operating system may obtain configuration data of components within the technology ecosystem. The configuration data may be, for example, obtained from an extended system configuration data (ESCD) file. In embodiments, a plug-and-play (PnP) handler may be used to identify, detect, and install drivers for a device of within the technology profile. Additionally, in embodiments, components may be identified on a network by employing features in the network protocol to signal devices and await a response, as well as scan for used ports on certain devices to identify specific services being active. A profile manager may obtain data to identify devices installation utility, a plug and play handler, and or any other process that automatically identifies available devices within an ecosystem/profile.

In some cases, a user may be presented with options to add detected components to their technology profile or to confirm the automatic addition of components to their technology profile. Accordingly, at reference number 302, components classified as phones that have been detected by the profile manager are listed in the technology profile. The detected phones include a MyPhone 2 and a Droid 4. At reference number 304, components classified as computers that have been detected by the profile manager are listed in the technology profile. The detected computers include a Top Notebook and an Old Desktop. At reference number 306, components classified as devices that have been detected by the profile manager are listed in the technology profile. The detected tablets include a Tab Pad 4. At reference number 308, components classified as home appliances that have been detected by the profile manager 300 are listed in the technology profile. The detected home appliances include a Computer Refrigerator. Finally, at reference number 310, components classified as gaming that have been detected by the profile manager 300 are listed in the technology profile. The detected gaming components include a Play Box 4.

Consider a scenario where User One wishes to share their technology profile. In embodiments, User One may be presented with a number of items present in User One's technology profile. As illustrated, User One may select components from the technology profile that User One wishes to share in a shared technology profile. In this manner, a user may selectively share details of their technology profile. The user can make a selection to share a portion or subset of items listed in the user's technology profile. In embodiments, the profile manager may render a list that includes all components of a user's technology profile. In embodiments, the profile manager may also display a configuration of each identified component. As used herein, a configuration of a component of the ecosystem may include memory type, memory size, operating system, software version, hardware version, and the like for the component. For example, the Old Desktop may further include a particular memory device, operating system, and specific applications.

To share the technology profile, a user can select components of the technology profile to the shared. Thus, a user may selectively share this technology profile for their own use and/or for use by others when acquiring components for the user. For example, the technology profile may be selectively shared with friends and family members to assist in acquiring devices for the sharer to ensure compatibility. As used herein, a sharer is a user who has shared their technology profile. The technology profile as shared by a user is referred to as a shared technology profile. The recipient of the shared technology profile can be a person, organization, or service. In embodiments, the components of the shared technology profile are a subset of components listed in the user's technology profile. Put another way, a user may have a full technology profile that includes all components owned, operated or available to the user. The shared technology profile as shared by the user may include components that are a subset of the user's full technology profile. The recipient of the shared technology profile may be identified by providing identifying details of the recipient. Identifying details, as used herein, may refer to an email address, username, Internet Protocol (IP) address, phone number, and the like. While particular identifying details have been described herein, any unique identifier may be used to identify the recipient of a shared technology profile.

As an example, a recipient of a shared profile may be identified by an email address. In embodiments, the recipient of a shared technology profile may receive an email with a link or instructions to retrieve the shared technology profile. The shared technology profile may be automatically retrieved by a profile manager of the recipient of the shared technology profile. In embodiments, the profile manager may manage a user's technology profile and also the shared technology profiles that are shared with the user. Additionally, a recipient of a shared technology profile may initiate sharing of a user's technology profile by sending a request for a shared technology profile to the user.

The updating of a shared technology profile may be criteria based. In particular, the shared technology profile may be updated automatically according to pre-determined criteria. For example, a user may indicate that the shared technology profile is updated automatically when components of the user's technology profile are modified or updated. Accordingly, in embodiments the update to the shared technology profile may be a push process. The push process may be an automated delivery of information where the request for a transaction to obtain the information is not initiated by the receiver of the information. In examples, the push process may be a push notification from a server to a user, where the transaction to obtain the notification is initiated by the server. Additionally, the shared technology profile may be updated manually, where a user specifically authorizes updates to previously shared technology profiles. In some cases, a user may indicate that the shared technology profile is updated automatically when particular classes of components within the user's technology profile are modified or updated. For example, a user may specify that the shared technology profile is automatically updated when a printer has been added or removed from the user's technology profile. Similarly, the user may specify that the shared technology profile is not automatically updated when a cellular phone has been added or removed from the user's profile. In this case, the user may decide when to manually update the shared technology profile to indicate that a cellular phone has been added or removed from the user's profile.

In some cases, an event may trigger the update of a shared technology profile. The shared technology profile may be updated based on the occurrence of an event that changes the technology ecosystem of a user. In examples, the event may include the installation of a device at a computing system. The event may also include coupling the device with the computing system. Moreover, the event may also include enabling the component to access a network within the technology ecosystem.

Figure 4:
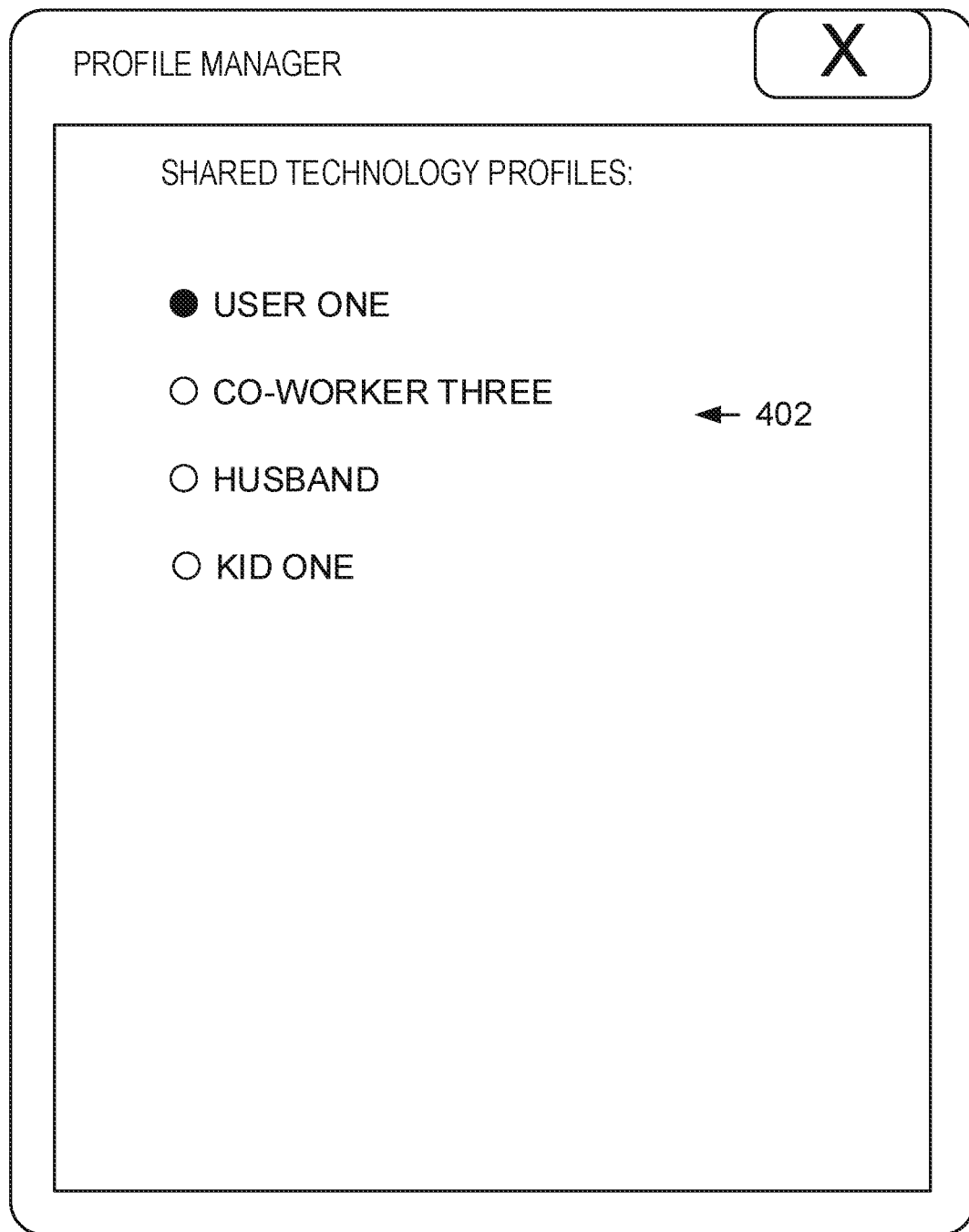
FIG. 4 is an illustration of the persons that have previously shared a technology profile.

FIG. 4 is an illustration of the persons that have previously shared a technology profile with a second party via profile manager 400. In the example of FIG. 4, the second party may be a person or persons. As illustrated in FIG. 4, a recipient may obtain one or more shared profiles 402. As illustrated, the recipient has received a shared technology profile from each of from User One, Co-worker Three, Husband, and Kid One. An operating system service, such as the profile manager, may enable storing one or more shared technology profiles. When the recipient of a shared technology wants to know if a particular device, product, or service is compatible with existing devices owned by another person, the recipient can consult the shared technology profile for that person.

Figure 5:
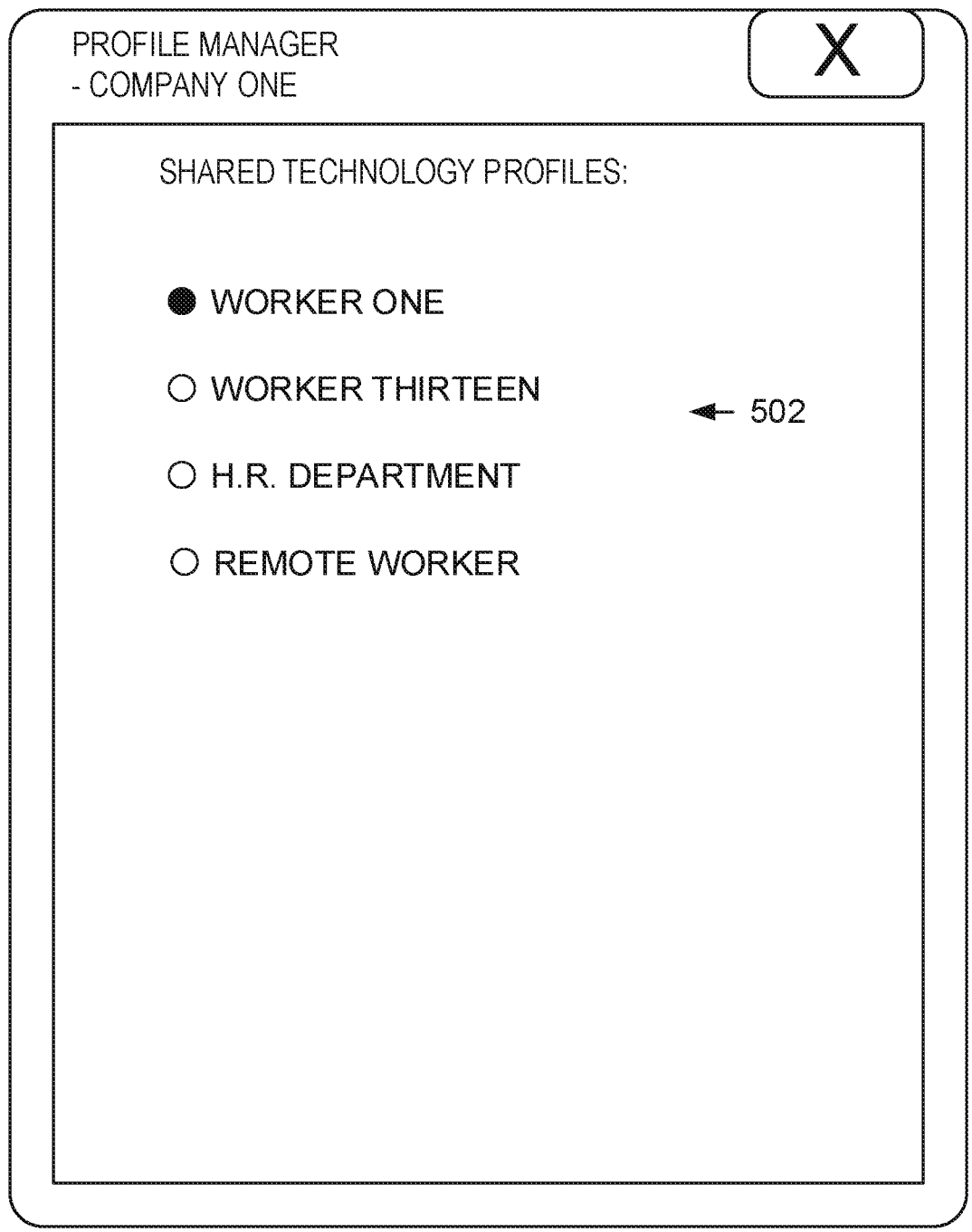
FIG. 5 is an illustration of the sharers that have previously shared a technology profile with a company.

FIG. 5 is an illustration of the persons or organization that have previously shared a technology profile with Company One. In the example of FIG. 5, the Company One has received a plurality of shared technology profiles 502 from persons and departments within Company One. As illustrated, the Company One has received a shared technology profile from each of from Worker One, Worker Thirteen, Human Resources (HR) Department, and Remote Worker. When the Company One needs to determine if particular devices, products, or services are compatible with existing devices owned by persons or departments within the company, shared technology profiles may be consulted. For example, Company One employs an HR Department. A shared technology profile for the HR Department may be obtained by the profile manager. In the event that an IT professional needs to replace or upgrade components owned, operated or available to the HR Department, the shared technology profile may be used to determine compatible components. In embodiments, within the context of an organization such as Company One, the full technology profile or persons or a department may be shared automatically, without selective sharing from the members within the company.

The shared technology profile may be updated automatically when the user who shared the technology profile updates the shared technology profile. In embodiments, the shared technology profile may be updated automatically when the technology profile is updated if the update to the technology profile is relevant to a component listed in the shared technology profile. An update to the technology profile is relevant to a component listed in the shared technology profile if the update changes the functionality associated with the component. In this manner, the recipient of the shared technology profile has access to the most up-to-date information regarding hardware, software, and services associated with the user who shared the technology profile. Access to this information empowers all users and encourages user acquisition of devices to expand the user's technology ecosystem. The information provided by the technology also enables a higher efficiency in the acquisition of devices, as users can have confidence in the acquisition being appropriate and compatible with an existing technology profile.

Figure 6:
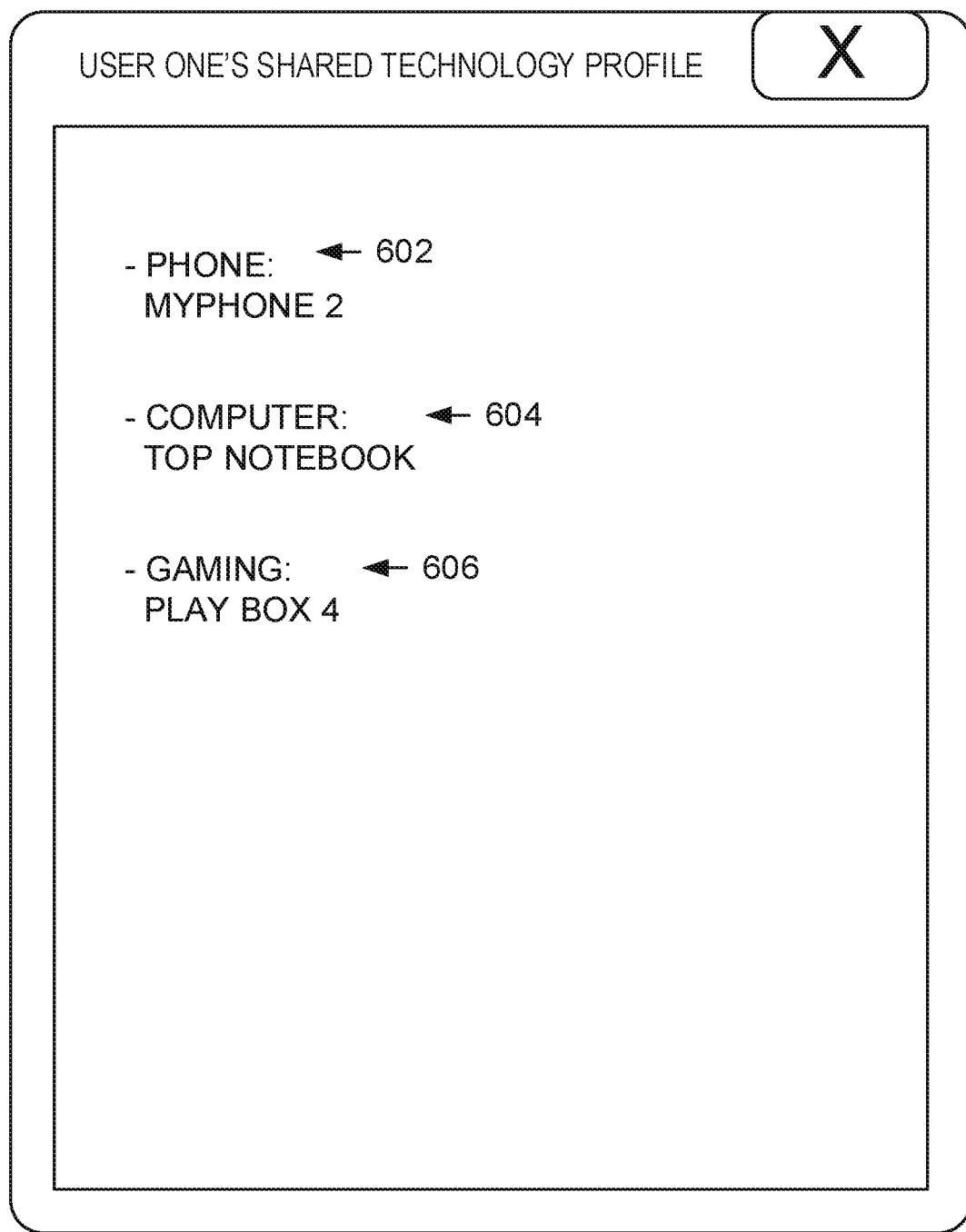
FIG. 6 is an illustration of a shared technology profile.

As illustrated in FIG. 4, a second user can select viewing of User One's shared technology profile from the list of shared technology profiles. FIG. 6 is an illustration of a shared technology profile 600. As illustrated, a User One has shared a technology profile with a second user, also known as a recipient of the shared technology profile. A company or organization can also be a recipient of the shared technology profile. In the example of FIG. 6, the second user can now view components currently owned, used, or associated with User One. Based on the existing components or devices, the second user can acquire devices or components for User One, fully aware of the current devices owned or associated with User One.

Figure 7:
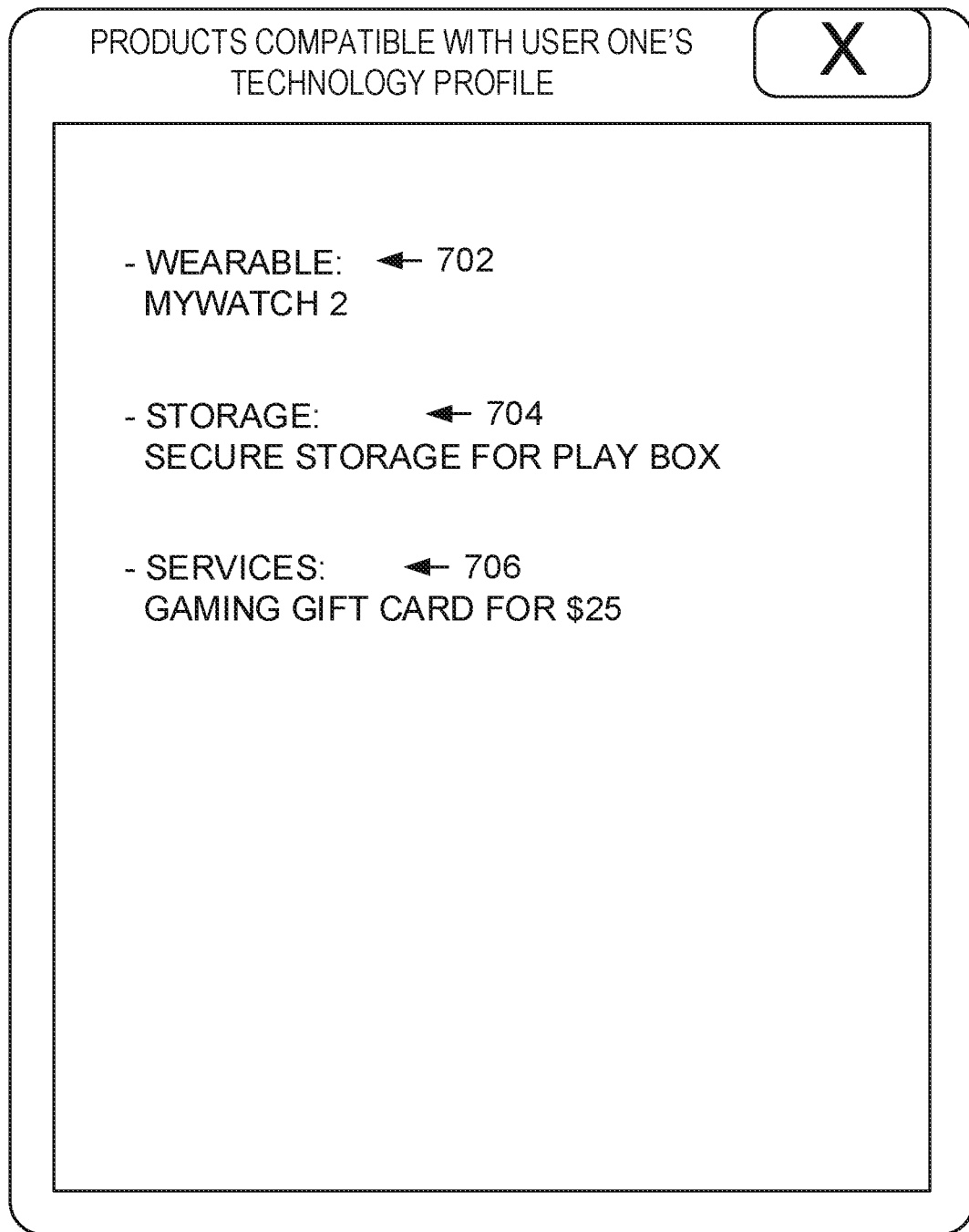
FIG. 7 is an illustration of an abstraction of a shared technology profile.

FIG. 7 is an illustration of an abstraction 700 of a shared technology profile. In the example of FIG. 7, the technology profile 600 as illustrated in FIG. 6 is abstracted such that the second user is not presented with the particular components of the shared technology profile from User One. However, the second user is informed of products, services, software, or hardware that are compatible components owned, used, or associated with User One as identified by the shared technology profile of User One. In this manner, the second user can confidently acquire components for User One knowing that they are compatible with existing components owned, used, or associated with User One. The second user does not know the specific details of the components owned, used, or associated with User One. In embodiments, the second user may identify a particular component or product and check for compatibility with User One's shared technology profile.

At reference number 702, a wearable device is recommended based on the shared technology profile 600. In this example, User One shares a technology profile including a MyPhone 2, and the MyWatch 2 is compatible with the MyPhone 2. The MyWatch2 may be recommended for addition to the components associated with User One due to compatibility with the MyPhone2. Similarly, since the User One shares a technology profile that includes a Play Box 4, a secure storage component compatible with the Play Box is recommended for addition to the components associated with User One at reference number 704. Finally, since the User One shares a technology profile that includes a Play Box 4, a gaming gift card for $25 is recommended for User One at reference number 706.

The shared technology profile according to the present techniques enables users to quickly identify ecosystem components that are compatible with devices the user currently owns, uses, or accesses. The technology profile according to the present techniques may strengthen the particular technology ecosystems to which the user belongs. Users can make acquisition decisions based on the particular ecosystem they want to belong, and can invest in ecosystems that integrate with their personal and professional environments.

In embodiments, the present techniques enable a user to selectively share his or her operating system-based technology profile. For example, in a Windows operating system, a user can enable access a Settings>System>Share System Settings feature within the operating system, such as Windows 10. With this setting enabled, User One initiates a "Please Share System Settings Request" to a User Two via an entered email address. When User Two receives the share request, he or she can accept or reject the request. If the request is rejected, User One is notified and the share request is logged on User Two's computer. In particular, the share request may be logged under "Declined or Revoked Share Requests" located at Windows Settings>System>Share System Settings within Windows 10. If the request is accepted, User One is notified, and the shared information is displayed in a "Shared with You" section on User One's Share System Settings page and in a "You are Sharing this Information With" section on User Two's Share System Settings page. In this manner, each user has full transparency of the system information to which they have access and the system information they are sharing. Information sharing can be revoked by User Two at any time.

In examples, the shared technology profile may be used as follows. A user may scan any candidate component (for example, game, peripheral such as printer, camera, etc.) to determine whether the user's technology profile will support the item. A parallel implementation of this feature is possible on gaming systems. The gaming system may be, for example, an Xbox. The availability of a shared technology profile enables friends, family members, or anyone with whom the user opted to share his/her technology profile to acquire devices compatible with the user's shared technology profile. The shared technology profile ensures that, for example, a game that someone is considering acquiring is operable with a system owned by User One.

The present techniques may be further extended to third-party retailers to enable integration with third-party applications. In particular, a targeted "wish list" may be generated based on a shared technology profile. As used herein, a wish list is a list of components desired by a user. Additionally, a wish list may be dynamically created based on the shared technology profile and known user information. In embodiments, the shared technology profile may be abstracted into a wish list, and a recipient of a shared technology profile may be given products that are known to be compatible with those owned by the sharer of the shared technology profile. In this manner, the recipient of the shared technology profile can acquire devices without frustration due to a lack of knowledge. Further, returns of acquired components may be reduced since the compatibility of the acquired component has been verified. This reduction in returned components results in a logistical and economical advantage to the third-party retailer.

Figure 8:
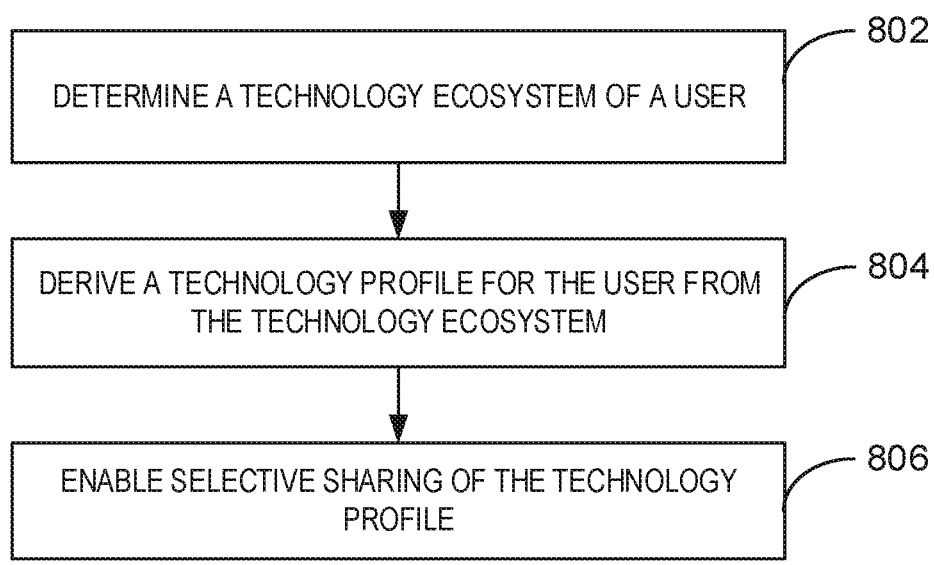
FIG. 8 is a block diagram of a method that enables sharing a technology profile.

FIG. 8 is a block diagram of a method that enables sharing a technology profile. At block 802, a technology ecosystem of a user is determined. In embodiments, a plurality of technology ecosystems of a user may be determined. At block 804, a technology profile for the user is derived from the technology ecosystem. The technology profile may include all components owned, operated, or accessed by the user. At block 806, selective sharing of the technology profile is enabled. The user may selectively share components from the user's technology profile with other users. In embodiments, updates to the user's technology profile are automatically shared with those who are recipients of the user's shared technology profile. In embodiments, a user's technology profile may be built by detecting components that access a particular network. Additionally, in embodiments the technology profile may be generated through device detection and identification at an operating system service.

In one embodiment, the process flow diagram of FIG. 8 is intended to indicate that the steps of the method 800 are to be executed in a particular order. Alternatively, in other embodiments, the steps of the method 800 can be executed in any suitable order and any suitable number of the steps of the method 800 can be included. Further, any number of additional steps may be included within the method 800, depending on the specific application.

Figure 9:
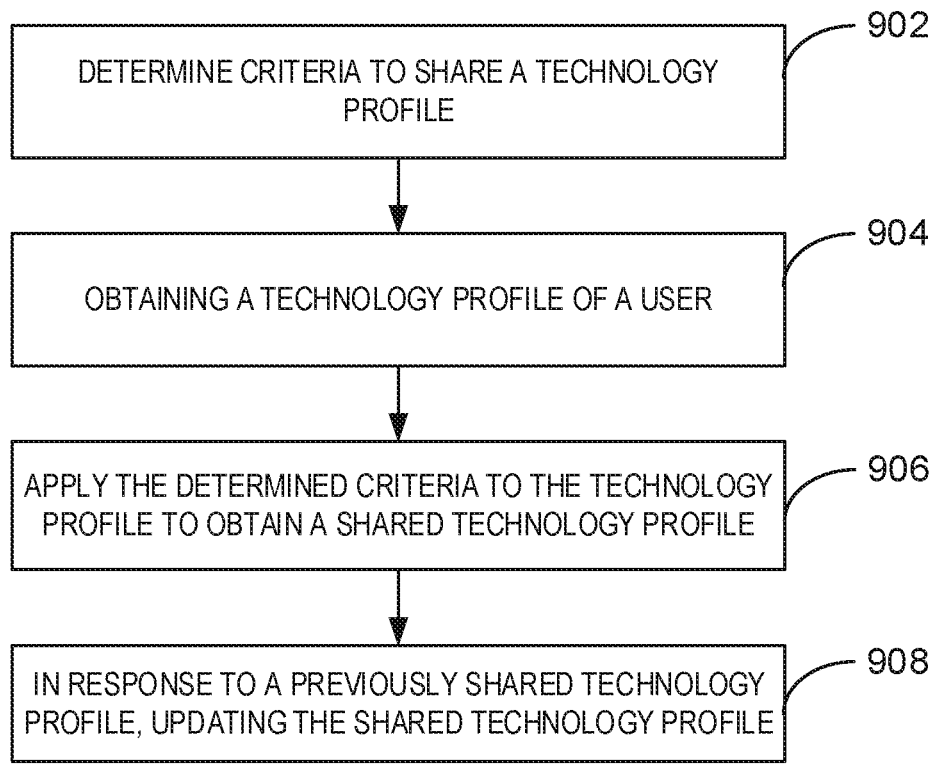
FIG. 9 is a block diagram of a method that enables selective sharing of a technology profile.

FIG. 9 is a block diagram that enables selective sharing of a technology profile. At block 902, criteria to share a technology profile is determined. In embodiments, the criteria may enable selective sharing based on manual or automatic criteria. For example, the criteria may indicate that components and to a technology profile are not added to a shared technology profile that is based on the technology profile without manual input from a user. Additionally, the criteria may indicate that a component added to a technology profile may be automatically updated on a shared technology profile. Additionally, the criteria may indicate particular components that are automatically updated at the shared technology profile when they are added or removed from the user's technology ecosystem.

At block 904, a technology profile of the user is obtained. In embodiments, the technology profile of the user may be obtained by determining components of the technology ecosystem owned, operated, or available to the user. At block 906, the determined criteria are applied to the technology profile to obtain a shared technology profile. Using the criteria enables a user to selectively share portions of the technology profile. Accordingly, the application of criteria to the technology profile enables selective sharing of the technology profile. At block 908, in response to a previously shared technology profile, the shared technology profile is updated.

In one embodiment, the process flow diagram of FIG. 9 is intended to indicate that the steps of the method 900 are to be executed in a particular order. Alternatively, in other embodiments, the steps of the method 900 can be executed in any suitable order and any suitable number of the steps of the method 900 can be included. Further, any number of additional steps may be included within the method 900, depending on the specific application.

Figure 10:
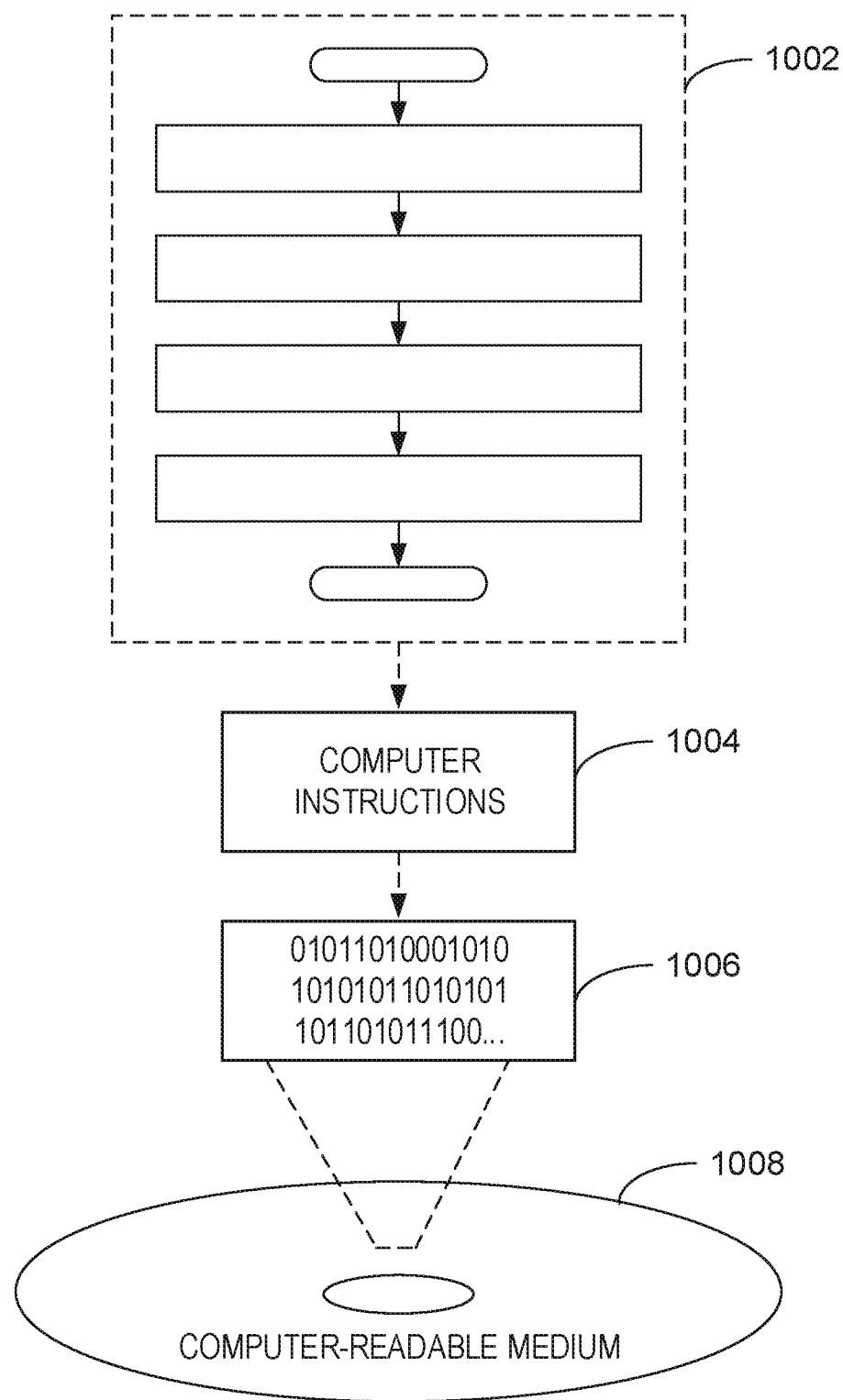
FIG. 10 is a block diagram illustrating an exemplary computer-readable storage medium encoded with instructions to enable a sharing a technology profile according to aspects of the disclosed subject matter.

Turning to FIG. 10, FIG. 10 is a block diagram illustrating an exemplary computer-readable storage medium encoded with instructions to enable a sharing a technology profile according to aspects of the disclosed subject matter. More particularly, the implementation 1000 comprises a computer-readable storage medium 1008 (e.g., a CD-R, DVD-R or a platter of a hard disk drive), on which is encoded computer-readable data 1006. This computer-readable data 1006 in turn comprises a set of computer instructions 1004 configured to operate according to one or more of the principles set forth herein. In one such embodiment 1002, the processor-executable instructions 1004 may be configured to perform a method, such as at least some of the exemplary method 800 of FIG. 8 or the exemplary method 1000 of FIG. 10, for example. In another such embodiment, the processor-executable instructions 1004 may be configured to implement a system, such as at least some of the exemplary system 1100 of FIG. 11, as described below. Many such computer-readable storage media may be devised by those of ordinary skill in the art that are configured to operate in accordance with the techniques presented herein.

Turning to FIG. 11, FIG. 11 is a block diagram illustrating an exemplary computing device 1100 configured to enable sharing of a technology profile according to aspects of the disclosed subject matter. The exemplary computing device 1100 includes one or more processors (or processing units), such as processor 1102, and a memory 1104. The processor 1102 and memory 1104, as well as other components, are interconnected by way of a system bus 1110. The memory 1104 typically (but not always) comprises both volatile memory 1106 and non-volatile memory 1108. Volatile memory 1106 retains or stores information so long as the memory is supplied with power. By contrast, non-volatile memory 1108 is capable of storing (or persisting) information even when a power supply is not available. Generally speaking, RAM and CPU cache memory are examples of volatile memory 1106 whereas ROM, solid-state memory devices, memory storage devices, and/or memory cards are examples of non-volatile memory 1108.

The processor 1102 executes instructions retrieved from the memory 1104 (and/or from computer-readable storage media, such as computer-readable storage medium 1008 of FIG. 10) in carrying out various functions of a two-way handoff between a bot and human as described above. The processor 1102 may be comprised of any of a number of available processors such as single-processor, multi-processor, single-core units, and multi-core units.

Further still, the illustrated computing device 1100 includes a network communication component 1112 for interconnecting this computing device with other devices and/or services over a computer network, including other user devices, such as components of the technology ecosystem 110 as illustrated in FIG. 1. The network communication component 1112, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 1112, is typically comprised of hardware and/or firmware components (and may also include or comprise executable software components) that transmit and receive digital and/or analog signals over a transmission medium (i.e., the network.)

The computing device 1100 also includes an operating system 1114. The operating system 1114 may establish a computing platform that supports the technology ecosystem as described with respect to FIG. 1. As illustrated in FIG. 11, a technology profile data store 1118 may store shared technology profiles. The computing device 1100 further includes a profile manager 1116 that may include a plurality of independent executable modules that are configured (in execution) as follows. In operation/execution, a monitor module 1120 may determine a plurality of plurality of technology ecosystems associated with a user. The maintenance module 1122 may enable automatic updating and maintenance of a technology profile. Finally, a sharing module 1124 may enable selective sharing of a technology profile. In embodiments, a user may selectively share components from the user's technology profile with other users. Updates to the user's technology profile are automatically shared with those are recipients of the user's technology profile.

EXAMPLES

Example 1 is a method. The method includes determining at least one technology ecosystem of a first user; generating a technology profile for the first user from the technology ecosystem, wherein the technology profile comprises components from the technology ecosystem associated with the first user; and selectively sharing a shared technology profile with a second user, wherein the shared technology profile is determined by the first user and is derived from the technology profile.

Example 2 includes the method of example 1, including or excluding optional features. In this example, the shared technology profile obtained by the second user is automatically updated in response to an update of the technology profile as shared by the first user.

Example 3 includes the method of any one of examples 1 to 2, including or excluding optional features. In this example, the technology profile is generated by detecting and identifying all components associated with the first user that interact, access, or serve a component of the technology ecosystem.

Example 4 includes the method of any one of examples 1 to 3, including or excluding optional features. In this example, the technology ecosystem includes an operating system, and the technology profile is generated by detecting and identifying all components that request support from the operating system.

Example 5 includes the method of any one of examples 1 to 4, including or excluding optional features. In this example, the technology ecosystem of the user comprises at least one fundamental component, and the technology profile includes components that are compatible with the fundamental component.

Example 6 includes the method of any one of examples 1 to 5, including or excluding optional features. In this example, the method includes abstracting the shared technology profile, wherein an abstracted shared technology profile identifies components that are compatible with the shared technology profile.

Example 7 includes the method of any one of examples 1 to 6, including or excluding optional features. In this example, the method includes abstracting the shared technology profile at a third-party retailer.

Example 8 includes the method of any one of examples 1 to 7, including or excluding optional features. In this example, the shared technology profile is shared with the second user according to identifying details of the second user.

Example 9 includes the method of any one of examples 1 to 8, including or excluding optional features. In this example, the shared technology profile obtained by the second user is automatically updated via a push process.

Example 10 includes the method of any one of examples 1 to 9, including or excluding optional features. In this example, the shared technology profile is updated based on the occurrence of an event that changes the technology ecosystem.

Example 11 is a system. The system includes a fundamental component used to establish a technology ecosystem, wherein a technology profile for a first user of the technology ecosystem comprises components from the technology ecosystem associated with the first user. The system also includes a profile manager. The profile manager is configured to generate the technology profile for the first user and selectively share a shared technology profile with a second user, wherein the shared technology profile is determined from the first user and is derived from the technology profile.

Example 12 includes the system of example 11, including or excluding optional features. In this example, the shared technology profile obtained by the second user is automatically updated in response to an update of the technology profile as generated for the first user.

Example 13 includes the system of any one of examples 11 to 12, including or excluding optional features. In this example, the technology profile is generated by detecting and identifying all components that access a network of a fundamental component.

Example 14 includes the system of any one of examples 11 to 13, including or excluding optional features. In this example, the technology profile is generated by detecting and identifying all components that request support from the fundamental component.

Example 15 includes the system of any one of examples 11 to 14, including or excluding optional features. In this example, the technology profile includes components that are compatible with the fundamental component.

Example 16 includes the system of any one of examples 11 to 15, including or excluding optional features. In this example, the system includes abstracting the shared technology profile, wherein an abstracted shared technology profile identifies components that are compatible with the shared technology profile.

Example 17 is a computer-readable storage medium bearing computer executable instructions. The computer-readable storage medium includes instructions that direct the processor to generate a technology profile for the first user from a technology ecosystem, wherein the technology profile comprises components from the technology ecosystem associated with the first user. In response to an indication from the first user, a shared technology profile is selectively shared with a second user, wherein the shared technology profile is determined by the first user and is derived from the technology profile. An update of the shared technology profile is automatically shared with the second user in response to an update of the technology profile as shared by the first user.

Example 18 includes the computer-readable storage medium of example 17, including or excluding optional features. In this example, the update of the shared technology profile is in accordance with pre-determined criteria.

Example 19 includes the computer-readable storage medium of any one of examples 17 to 18, including or excluding optional features. In this example, first user authorizes the update of the shared technology profile.

Example 20 includes the computer-readable storage medium of any one of examples 17 to 19, including or excluding optional features. In this example, the update to the shared technology profile is in response to an occurrence of an event that changes the technology ecosystem.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method, comprising:
   determining a technology ecosystem of a first user, wherein the technology ecosystem comprises a fundamental component and at least one other component that expands a functionality of the fundamental component within the technology ecosystem;
   generating a technology profile for the first user from the technology ecosystem, wherein the technology profile comprises the fundamental component and the at least one other component within the technology ecosystem that is associated with the first user, and wherein the technology profile is generated by detecting and identifying all of the at least one other components associated with the first user that interact with, access, or serve the fundamental component of the technology ecosystem; and
   selectively sharing a shared technology profile with a second user, wherein the shared technology profile comprises the fundamental component and any of the at least one other components within the technology profile that the first user wishes to share with the second user.

2. The method of claim 1, wherein the shared technology profile obtained by the second user is automatically updated in response to an update of the technology profile as shared by the first user.

3. The method of claim 1, wherein the fundamental component comprises an operating system, and wherein the technology profile is generated by detecting and identifying all of the at least one other components that request support from the operating system.

4. The method of claim 1, comprising abstracting the shared technology profile, wherein an abstracted shared technology profile identifies additional components that are compatible with the shared technology profile.

5. The method of claim 4, comprising abstracting the shared technology profile at a third-party retailer.

6. The method of claim 1, wherein the shared technology profile is shared with the second user according to identifying details of the second user.

7. The method of claim 1, wherein the shared technology profile obtained by the second user is automatically updated via a push process.

8. The method of claim 1, wherein the shared technology profile is updated based on the occurrence of an event that changes the technology ecosystem.

9. A system, comprising:
   a processor; and
   memory devices accessible to the processor, the memory devices storing memory components for execution by the processor, the memory components comprising:
      a fundamental component used to establish a technology ecosystem, wherein a technology profile for a first user of the technology ecosystem comprises a fundamental component and at least one other component that expands a functionality of the fundamental component within the technology ecosystem associated with the first user; and
      a profile manager configured to:
         generate the technology profile for the first user, wherein the technology profile is generated by detecting and identifying all of the at least one other components that perform at least one of accessing a network of the fundamental component or requesting support from the fundamental component; and selectively share a shared technology profile with a second user, wherein the shared technology profile comprises the fundamental component and any of the at least one other components within the technology profile that the first user wishes to share with the second user.

10. The system of claim 9, wherein the shared technology profile obtained by the second user is automatically updated in response to an update of the technology profile as shared by the first user.

11. The system of claim 9, comprising abstracting the shared technology profile, wherein an abstracted shared technology profile identifies additional components that are compatible with the shared technology profile.

12. A computer-readable storage medium bearing computer executable instructions which, when executed on a computing system comprising at least a processor, carry out a method for sharing a technology profile of a first user, the method comprising:

generating the technology profile of the first user from a technology ecosystem, wherein the technology profile comprises a fundamental component and at least one other component that expands a functionality of the fundamental component within the technology ecosystem associated with the first user, and wherein the technology Profile is generated by detecting and identifying all of the at least one other components that perform at least one of accessing a network of the fundamental component or requesting support from the fundamental component;

in response to an indication from the first user, selectively sharing a shared technology profile with a second user, wherein the shared technology profile comprises the fundamental component and any of the at least one other components within the technology profile that the first user wishes to share with the second user; and automatically sharing an update of the shared technology profile with the second user in response to an update of the technology profile as shared by the first user.

13. The computer-readable storage medium of claim 12, wherein the update of the shared technology profile is in accordance with pre-determined criteria.

14. The computer-readable storage medium of claim 12, wherein the first user authorizes the update of the shared technology profile.

15. The computer-readable storage medium of claim 12, wherein the update to the shared technology profile is in response to an occurrence of an event that changes the technology ecosystem.

* * * * *